United States Patent [19]

Braga et al.

[11] Patent Number: 4,712,825

[45] Date of Patent: Dec. 15, 1987

[54] SUPPORT ARM FOR THE TRUCK LID AND/OR THE HOOD OF A MOTOR CAR

[75] Inventors: Renzo Braga, Milan; Renato Pasquali, Garbagnate Milanese; Franco Mendicino, Arese, all of Italy

[73] Assignee: Alfa Romeo Auto S.p.A., Naples, Italy

[21] Appl. No.: 928,091

[22] Filed: Nov. 7, 1986

[30] Foreign Application Priority Data

Nov. 21, 1985 [IT] Italy ............................ 23912/85[U]

[51] Int. Cl.[4] ............................................ B62D 25/10

[52] U.S. Cl. .................................... 296/76; 180/89.2

[58] Field of Search ......................... 296/76; 180/89.2

[56] References Cited

U.S. PATENT DOCUMENTS 3,643,755 2/1972 Gionet et al. ........................ 296/76

FOREIGN PATENT DOCUMENTS 701797 12/1940 Fed. Rep. of Germany ........ 296/76

1123578 2/1962 Fed. Rep. of Germany ........ 296/76

2223208 11/1973 Fed. Rep. of Germany ........ 296/76

104469 6/1982 Japan .................................... 296/76

*Primary Examiner*—Robert R. Song

*Attorney, Agent, or Firm*—Charles E. Brown; Charles A. Brown

[57] ABSTRACT

A supporting arm for the trunk lid or the hood of a motor car. The trunk lid or hood has at least one arm with one part fastened thereto and another part of the arm hinged onto the bodywork of the same motor car. The hinged part of the arm comprises a plate secured to the bodywork of the motor car and a flange fixed to the arm. The flange and plate are pivotable about one another and are secured against rotation by a screw.

3 Claims, 4 Drawing Figures

SUPPORT ARM FOR THE TRUCK LID AND/OR THE HOOD OF A MOTOR CAR

The present invention relates to an arm for supporting the trunk lid, or also the hood, of a motor car, wherein the trunk lid or hood is hinged onto the bodywork, in such a way that, if desired, it can carry out an additional shift, either of translational or of rotary-translational type.

In some motor car types, especially of the three-volume type, the trunk lid, or the hood too, is mounted in the bodywork with its inner edge being adjacent to the lower edge of the rear windshield or of the windshield, and in some cases, being even superimposed to the windshield gasket.

Of course, the hinging system of the trunk lid or of the hood is so accomplished that the lifting and sinking strokes can be performed without that interferences may occur with the adjacent walls of the bodywork; but, if the trunk lid or hood is hinged onto the bodywork in correspondence of its inner edge, it may happen that its moving apart from the frame of the rear windshield or of the windshield occurs along a very small distance, also in the position of complete opening.

This fact may create problems during the step of assemblage of the car, because, should the trunk lid or hood be hinged onto the bodywork before the painting, should it hinder the mounting of the glasses of the rear windshield or of the windshield inside their related frame, subsequently dismantling them would become necessary.

Such a duplication of operations has a negative effect on the assemblage times and costs, besides increasing the possibilities of assemblage mistakes or of damaging of the parts.

Purpose of the present invention is to provide a solution which overcomes these drawbacks, rendering simpler and easier the assemblage operations; such a purpose is achieved by means of a supporting arm which, when required, allows an additional shift of the trunk lid or hood.

According to the invention, to the trunk lid or hood at least an arm is fastened, which is hinged onto the bodywork, and is characterized in that it is accomplished in two parts, constrained to each other by linking means of the hinge type, and by manually disengageable lock means.

Preferably, the two parts of the said arm are formed by a shaped rod fastened to the trunk lid or hood and by a plate hinged onto the bodywork, the rod being provided with a flange, which is constrained, in its turn, to the said plate, by means of a pin and of a screw.

By this solution, during the assemblage step, the screw which renders the flange and the plate solid with each other is locked, so that the rod is free to rotate relatively to the same plate, and the trunk lid or hood can be spaced apart from the rear windshield or from the windshield, to allow the glass to be mounted.

Characteristics and advantages of the present invention are now illustrated with reference to the hereto attached figures, wherein to non-limitative exemplifying purposes a preferred practical embodiment of the same invention is shown. In the figures.

Figure 1:
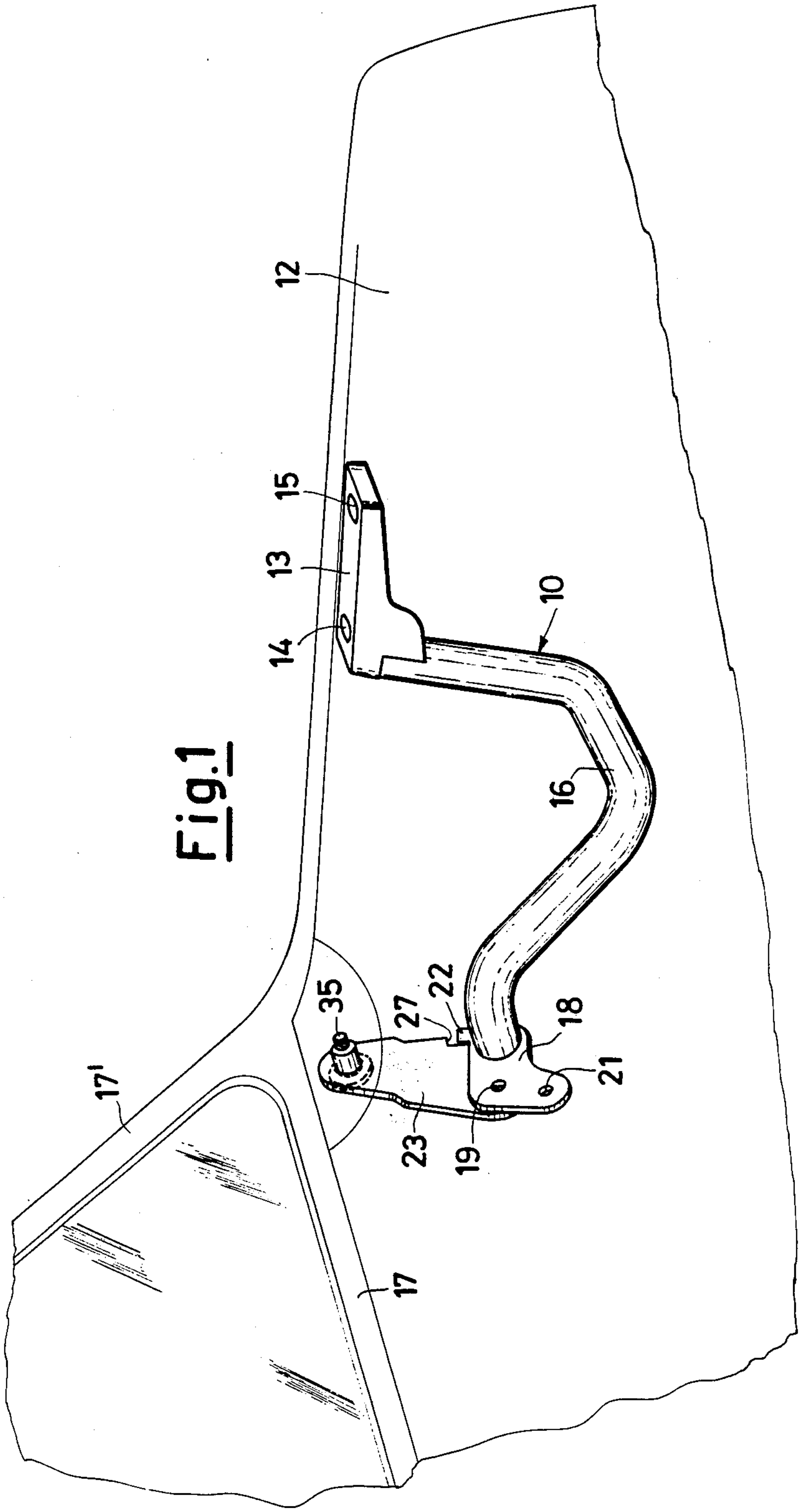
FIG. 1 is a perspective view of a supporting arm for the trunk lid or the hood of a motor car.

In FIG. 1, with 10 an arm is generally indicated, which supports on one side the lid 11 (shown in FIG. 3) of the trunk 12 of a motor car; with the arm 10 solid is a bracket, indicated with 13, which is provided with holes 14 and 15, which allow the same arm to be fastened by bolts onto the framework of the trunk lid 11. A specular arm (not shown) supports the trunk lid 11 at the other side. In FIG. 1, there are furthermore shown the lower crosspiece 17 and the upright 17', which bound the frame of the rear windshield of the motor car.

Figure 2:
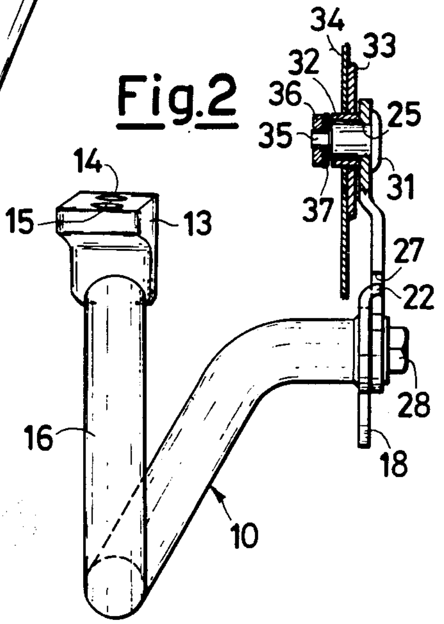
FIG. 2 is a partly sectional front view of the arm of FIG. 1.
Figure 4:
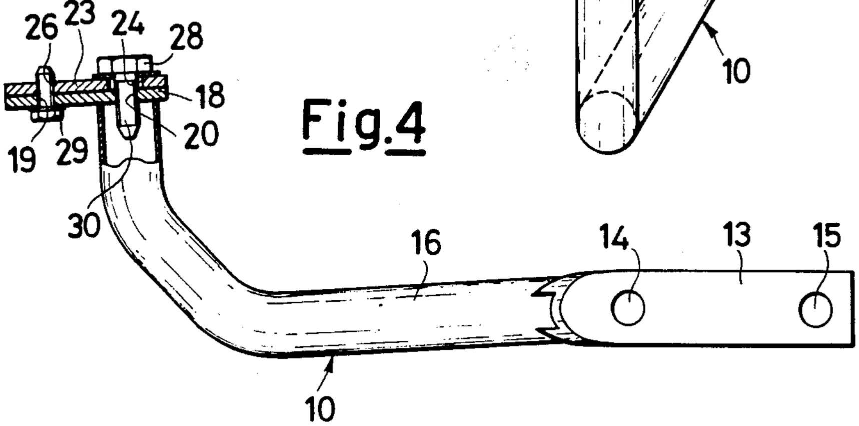
FIG. 4 is a partly sectional top view of the arm of FIG. 1.

The arm 10 is constituted by a shaped tubular rod 16, which, as it results from FIGS. 2 and 4, is welded to a flange 18 which is provided with holes 19, 20, 21, of which the second one only is threaded, and is also provided with a stop tooth 22.

With 23 indicated is a plate, provided with holes 24, 25 and 26 (visible in FIGS. 2, 3, 4), the third one of which is threaded; the plate 23 is furthermore provided with a stop hollow 27 cooperating with the tooth 22.

The flange 18 and the plate 23 are made solid with each other by the pin 28, which is provided with a threaded stem 30, screwed inside the hole 20 of the same flange 18 and by the screw 29, which is screwed down inside the hole 26 of the plate 23, as shown in FIG. 4.

To the plate 23 a pin 31 is welded, which is supported inside a sleeve 32 solid with a reinforcing disc 33, in its turn welded to the sheet 34 of a side wall of the trunk 12, as it results also from FIG. 1.

The pin 31 is provided with a threaded stem 35, onto which a nut 36 is screwed down, with the interposition of a washer 37, said nut 36 performing the task of locking the same pin 31 in its axial direction.

In the figures a spring, which is hooked to the hole 21 of the flange 18 and to the side wall of the trunk, to actuate the opening of the trunk lid 11, is not shown.

According to the invention, the arm 10 is formed by two parts, the rod 16 with the flange 18 and the plate 23, which are solid with each other when the screw 29 is inserted inside the hole 19 of the same flange 18 and is screwed down inside the hole 26 of the plate 23.

Figure 3:
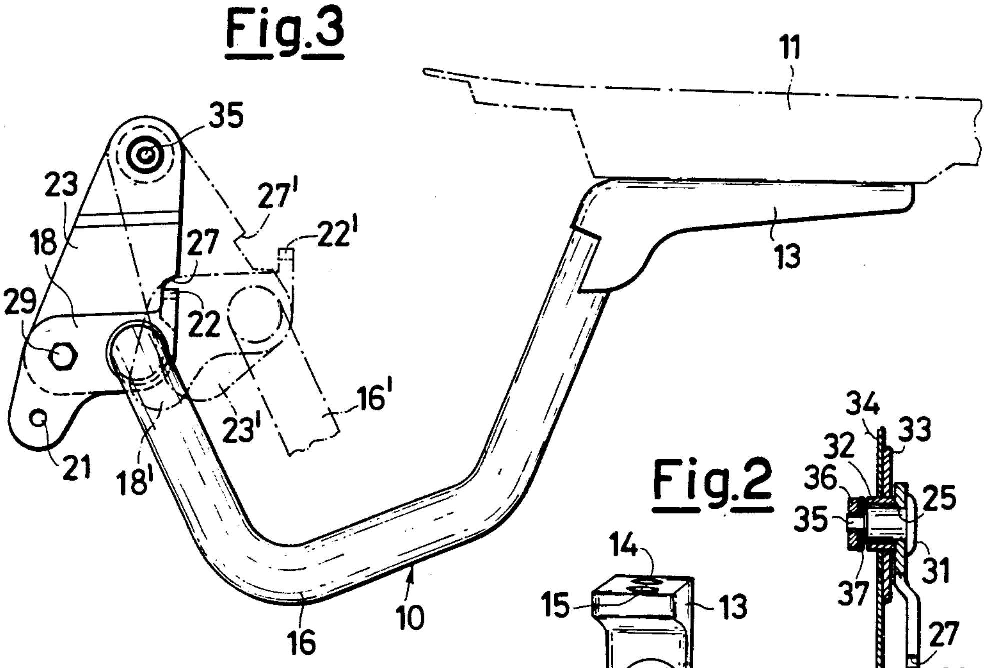
FIG. 3 is a partly sectional elevation view of the arm of FIG. 1.

Thus, during the step of the assemblage of the motor car, after the painting of the complete bodywork of the trunk lid 11, the glass and the gasket can be assembled in the rear windshield frame, with the same trunk lid getting spaced apart, without being dismantled, because, after that screw 29 has been unscrewed, the arm 16 with the flange 18 remains only hinged onto the plate 23 and is hence free to rotate around the axis of pin 28, allowing the trunk lid 11 to translate, as shown by chains, and indicated with 16', 18', 23', 27' in FIG. 3.

After the assemblage of the glass and of the gasket of the rear windshield, by a relative rotation between the plate 23 and the flange 18, until the tooth 22 comes to stop against the hollow 27, the axes of the holes 19 and 26 are lined up again, and the screw 29 can be screwed down again inside the hole 26, so that the plate 23 and the flange 18 are made again solid with each other, and the arm 10 becomes formed again by one single piece.

We claim:

1. A supporting arm for the trunk lid or the hood of a motor car, said arm having a first part fastened to the trunk lid or the hood of the motor car, said arm having a second part which hinges said arm onto the bodywork of the same motor car, said second part of said arm comprising hinge linking means for hingeably attaching said arm and secured trunk lid or hood to the motor car whereby the trunk lid or the hood may open and close relative to the motor car, and said hinge linking means having manually disengagable lock means for releasing said hinge linking means to permit the trunk lid or the hood to be spaced away and apart from the rear windshield or the windshield respectively whereby the glass may be mounted in the motor car.

2. Supporting arm according to claim 1, wherein said arm is a shaped rod, and said hinge linking means comprises a plate hinged onto the bodywork of the motor car and a flange fixed to the rod, said flange is pivotally fixed to said plate by a pin, and said flange is fixed against rotation relative to said plate by a screw securing said flange to said plate.

3. Supporting arm according to claim 2, wherein said flange is provided with a stop tooth and said plate is provided with a stop hollow for receiving said stop tooth whereby rotational movement of said flange with said plate is limited in one direction.

* * * * *